Feb. 28, 1950    H. D. STEINBACK    2,499,040
PRESSURE RESPONSIVE SWITCH
Filed Oct. 20, 1945    2 Sheets-Sheet 1

INVENTOR.
HERBERT D. STEINBACK
BY
Kenyon & Kenyon
ATTORNEYS

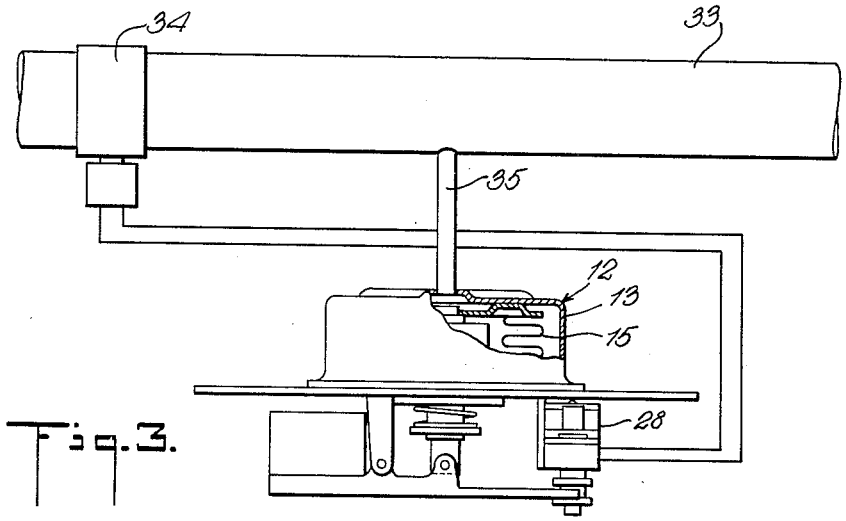
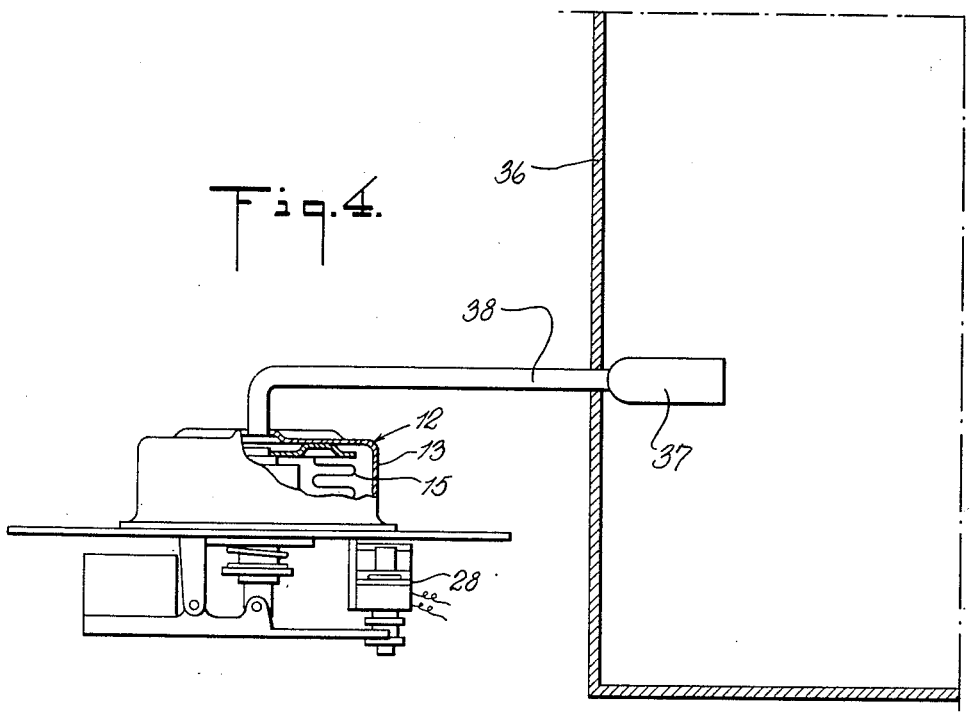

Patented Feb. 28, 1950

2,499,040

UNITED STATES PATENT OFFICE 2,499,040

PRESSURE RESPONSIVE SWITCH

Herbert D. Steinback, Wilmette, Ill., assignor, by mesne assignments, to Allied Control Company, Inc., a corporation of New York Application October 20, 1945, Serial No. 623,518

6 Claims. (Cl. 200—83)

This invention relates to pressure-responsive devices.

In the operation of airplanes, it is desirable to have certain controls become effective as the airplane reaches predetermined elevations either upon rising or descending. Usually, such controls are electrical in nature.

An object of this invention is a simple, compact, efficient and relatively inexpensive pressure-responsive device suitable for effecting operation of an electrical switch forming part of a control unit.

Although the embodiment of the invention herein specifically disclosed is primarily adapted for use in connection with airplane controls, it is to be understood that the invention is also applicable for use in other forms of control units where a response to pressure change is desired. The instant desclosure is merely in the nature of an example of one use to which the invention may be put. The device may also be used to regulate gas pressure in a conduit or it may be utilized as a temperature regulator.

Other objects, novel features and advantages of this invention will become apparent from the following specification and accompanying drawings, wherein:

Fig. 3 is a view illustrating the use of the device for the regulation of gas pressure in a conduit, and Fig. 4 is a view illustrating use of a device for temperature regulators.

Figure 1:
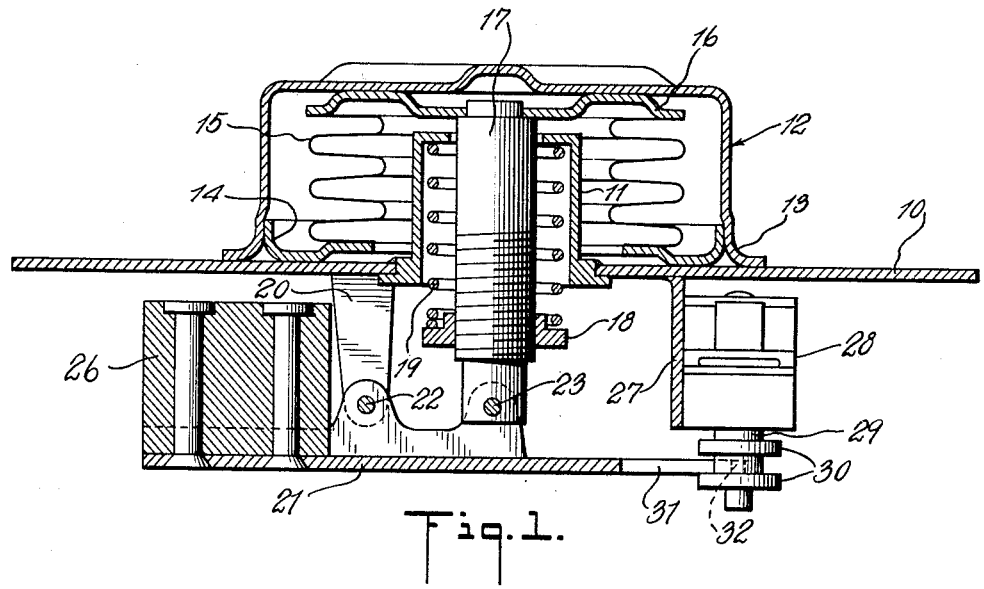
Fig. 1 is a vertical section through an embodiment particularly adapted for use in airplanes.
Figure 2:
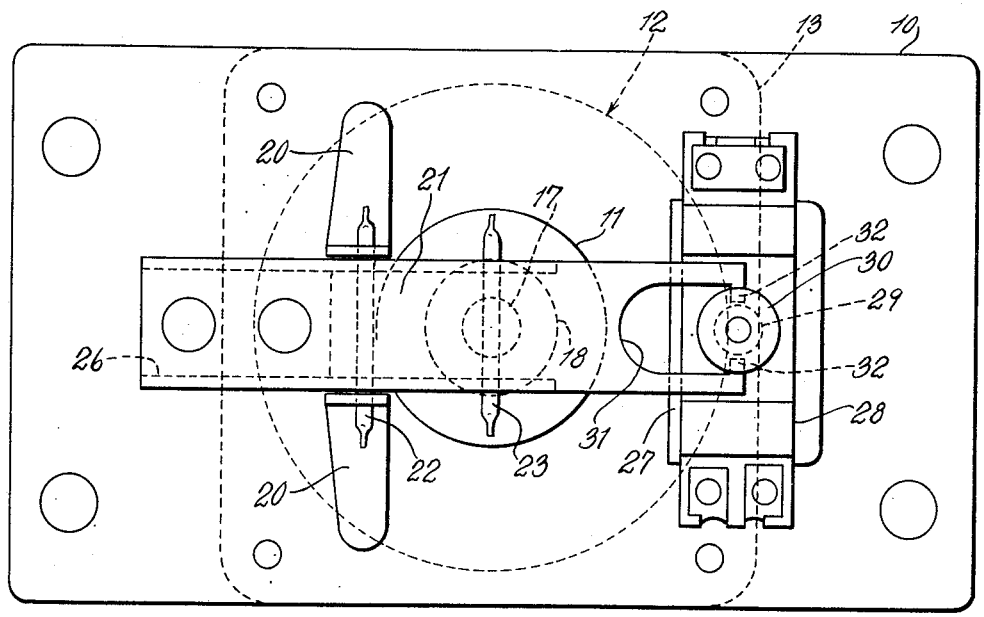
Fig. 2 is a bottom view of Fig. 1.

A horizontal metal plate 10 has an aperture within which is received the rim of an inverted metal cup 11, there being a mechanical connection between the plate and the cup. A generally cylindrical housing 12 rests on the upper face of the plate 10 and is suitably attached thereto. The housing 12 comprises a cup-shaped member 13 having its rim contacting the plate 10 and an annular closure member 14 filling the mouth of the cup and connected thereto by a fluid-tight seal such, for example, as solder. The cup-shaped member 11 projects through the opening in the annular closure 14 into the interior of the casing 12. A bellows member 15 of thin resilient metal has one end hermetically sealed to the closure member 14 adjacent the aperture and has its remaining end hermetically sealed to a circular plate 16 near the rim thereof.

The plate 16 overlies the inner end of the cup-shaped member 11 and supports a stem 17 which passes through an aperture in the bottom of the member 11 to a point below the plate 10. On the stem 17 is threaded a collar 18 between which and the bottom of the cup member 11 is arranged an expansion spring 19. A bracket 20 extends downwardly from the underface of the plate 10 and pivotally supports a lever 21 on a pin 22 arranged intermediate the ends of the lever. The lever 21 is pivotally connected to the stem 17 to the right of the pin 22 by a pin 23 and to the left of the pin 22 carries a weight 26 of proper mass to constitute a counterbalance effectively eliminating the effect of gravity on operation of the device.

A bracket 27 extending from the lower face of the plate 10 supports a set type toggle switch 28 of standard construction and having a reciprocable operating member 29, one end of which is provided with a pair of spaced collars 30. The lever 21 is recessed at 31 to form a yoke receiving the member 29 and having studs 32 projecting into the annular space between the collars 30. The studs 32 are of less thickness than the space between the collars 30 so as to permit slight movement of the lever 21 relative to the member 29. The switch 28 is operated between two rest positions by movement communicated to the lever 29 by the lever 21. The switch 28 constitutes part of a control circuit (not shown).

The space between the inner surface of the housing 12 and the bellows assembly 14, 15 and 16 is highly evacuated so that a pressure differential of approximately 15 pounds exists between the inner and outer surfaces of the bellows at normal atmospheric pressure. Such pressure differential maintains the parts of the assembly in the position shown with the spring 19 under compression and with the switch-actuating member 29 in one rest position. In this position of the member 29, the bellows member 15 is in its neutral position. Upon decrease of the pressure differential such as occurs upon the device being lifted to a higher elevation, the spring 19 expands to contract the bellows member 15 and push the stem 17 downwardly, thereby swinging the lever 21 clockwise to move the member 29 a sufficient distance toward its second rest position for the switch to operate automatically. The stem 17 and switch 28 remain in their actuated positions until the pressure differential is increased to its original value by return of the assembly to a lower elevation, whereupon reverse operation of the device is effected to return it to its original condition. The strength of the spring 19 may be adjusted by rotation of the collar 18 on the stem 17.

The device above described will withstand under operating conditions a vibrating force equivalent to an acceleration equal to 10 times the acceleration of gravity (.62" total excursion at 55 cycles/second) without operation of the switch except upon sufficient change in the pressure differential between the interior and exterior of the bellows 15. The switch thus meets the requirements placed by the U. S. Army and Navy on barometric switches for use in airplanes.

In Fig. 3, 33 is a conduit containing gas under pressure and provided with a regulating solenoid-actuated valve 34. A pipe 35 leads from the conduit 33 to the housing 12 of the pressure-responsive device above described and is so attached thereto that the space between the casing 13 and the bellows 15 is in communication with the conduit 33. The switch 28 of the pressure-responsive device is suitably connected to the solenoid of the valve 34 to effect operation thereof. The arrangement is such that as long as a predetermined pressure exists in the conduit 33, the valve 34 remains open. However, in the event of a decrease of pressure in the conduit 33, the pressure-responsive device reacts to operate the switch 28 to effect closing of the valve 34 until the predetermined pressure is re-established in the conduit 33.

In Fig. 4, 36 indicates a chamber in which a predetermined temperature is to be maintained. Within the chamber is provided a capsule 37 having a pipe 38 leading from one end to the casing 12 of the pressure-responsive device above described, the connection being such that the interior of the capsule 37 is in communication with the space between the housing 13 and the bellows 15. The capsule 37, pipe 38 and space just referred to are filled with a thermo-sensitive liquid. The switch 28 is suitably connected to heating means (not shown). Upon increase of temperature in the chamber 36 the thermo-sensitive liquid in the capsule 37 expands, resulting in operation of the pressure-responsive device to discontinue the supply of heat.

I claim:

1. A pressure responsive device comprising a housing having an opening therein, a bellows having one end hermetically sealed around said opening to said housing and a movable end within said housing, means hermetically sealing the movable end of said bellows, said bellows and said means defining with said housing a pressure chamber, a stem affixed to said means and extending through said opening, means biasing said means and said stem toward the fixed end of said bellows, a lever pivotally affixed with respect to said housing, connections between said stem and one arm of said lever whereby said lever may be rotated in response to expansion and contraction of said bellows, and a counterbalance weight on said lever mass balancing the system of said lever about its pivot to eliminate effects of acceleration forces thereon.

2. A pressure responsive device according to claim 1 including a switch fixed with respect to said housing and connections between said lever and switch for effecting actuation of the latter by the former.

3. A pressure responsive device according to claim 2 in which said last mentioned connections include means constructed and arranged to provide lost motion between the movement of said lever and the actuation of said switch thereby whereby to provide a predetermined range of expansion and contraction of said bellows in which range no actuation of said switch may occur.

4. A pressure responsive device comprising a housing having an opening therein, a cup-shaped member extending within said housing having its rim attached to said housing, a bellows enclosing said member and having one end hermetically sealed around said opening to said housing and a movable end within said housing, a plate hermetically sealing the movable end of said bellows, said bellows and said plate defining with said housing a pressure chamber, a passageway through the bottom of said cup-shaped member, a stem affixed to said plate and extending through said passageway and opening, spring means between said cup-shaped member and stem biasing said plate and said stem toward the fixed end of said bellows, a lever pivotally supported by said housing, connections between said stem and one arm of said lever whereby said lever may be rotated in response to expansion and contraction of said bellows, and a counterbalance weight carried by the other arm of said lever mass balancing the system of said lever about its pivot to eliminate effects of acceleration forces thereon.

5. A pressure responsive device according to claim 4 including a switch supported by said housing and connections between said lever and switch for effecting actuation of the latter by the former in response to movement of said plate.

6. A pressure responsive device according to claim 5 in which said last mentioned connections include an actuating member for said switch, spaced collars on said actuating member, said one arm of said lever being constructed and arranged to move with lost motion between said collars whereby to provide a predetermined range of expansion and contraction of said bellows in which range no actuation of said switch may occur.

HERBERT D. STEINBACK.

REFERENCES CITED

The following references are of record in the file of this patent:

UNITED STATES PATENTS

| Number | Name | Date |
|---|---|---|
| 1,163,385 | Waters | Dec. 7, 1915 |
| 1,372,500 | Gamille | Mar. 22, 1921 |
| 1,653,177 | Herz | Dec. 20, 1927 |
| 2,209,721 | Taylor et al. | July 30, 1940 |
| 2,214,556 | Jewell | Sept. 10, 1940 |
| 2,216,699 | Berger | Oct. 1, 1940 |
| 2,302,250 | Penn | Nov. 17, 1942 |
| 2,316,009 | Martin et al. | Apr. 6, 1943 |
| 2,355,872 | Kronmiller | Aug. 15, 1944 |
| 2,357,878 | Crew | Sept. 12, 1944 |
| 2,429,158 | Francis | Oct. 14, 1947 |